METHOD AND MEANS FOR OBTAINING A PREDETERMINED PHASE SHIFT CHARACTERISTIC

Filed Dec. 22, 1949

INVENTOR.
WALTER H. ERIKSON
WARNER A. ELIOT
BY
T. L. Bowes
ATTORNEY

Patented Oct. 27, 1953 2,657,276

UNITED STATES PATENT OFFICE 2,657,276

METHOD AND MEANS FOR OBTAINING A PREDETERMINED PHASE SHIFT CHARACTERISTIC

Warner A. Eliot, New Canaan, Conn., and Walter H. Erikson, Rochester, N. Y., assignors to Stromberg-Carlson Company, a corporation of New York Application December 22, 1949, Serial No. 134,492

6 Claims. (Cl. 179—100.1)

Figures 1A, 1B, 2A, 2B:
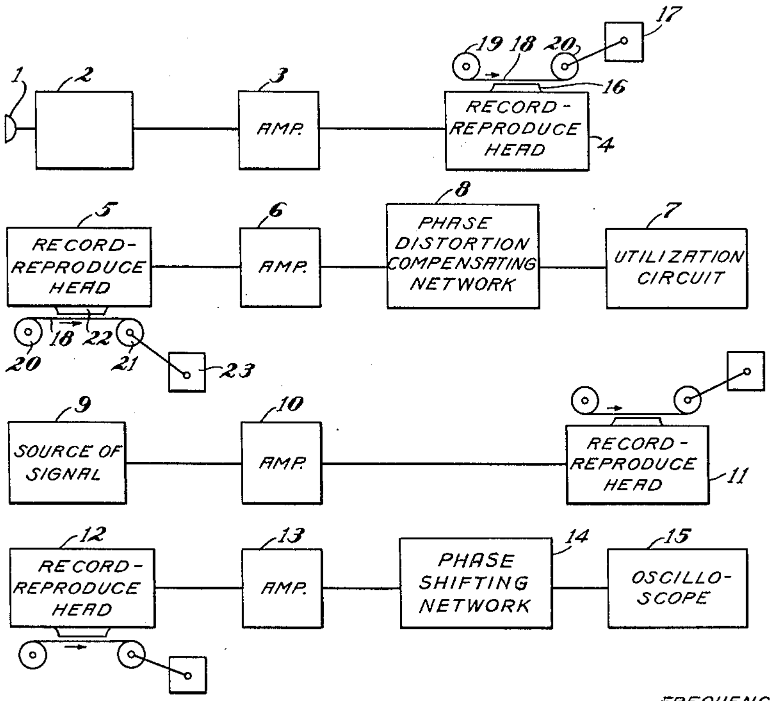

This invention relates to a method and apparatus for obtaining desired phase shift characteristics and more particularly to a method and means for introducing a phase shift characteristic in order to compensate for undesired phase shift characteristics.

Any electrical system in which the waveform of the output voltage is an exact replica of the input, may be said to provide distortionless transmission. Such transmission requires not only that there be no relative attenuation of the frequency components under consideration as a result of transmission and that there be no new frequency components introduced as a result of transmission, but also that there be no change in the time relationship of the frequency components as a result of transmission. The last-mentioned consideration dictates that all components be delayed by an equal time during transmission which is equivalent to specifying that the phase characteristic of the system be proportional to frequency passing through zero degrees at zero cycles per second.

It has been proposed heretofore to utilize recording, re-recording in reverse, and finally reproduction in the original direction in order to compensate for phase shift or distortion arising from the components employed in the recording and reproducing channels, for example. In some instances, however, the source of phase distortion is a device or means incapable of accepting a reversed electrical signal. For example, if the input to a recording system includes a transducer such as a condenser type microphone operated at such low frequencies that serious phase errors are introduced into the input coupling circuit, previously proposed techniques cannot be employed to compensate for the resulting phase shift. In other cases, it may not be necessary to compensate for phase shift, but it may be desired to introduce phase shift which is the reverse or negative with respect to a known phase shift characteristic but with respect to which there is no known physical counterpart.

It is an object of our invention to provide new and improved means and method for introducing phase shift of predetermined characteristics whenever desired.

It is another object of our invention to provide new and improved means and method for compensating for undesired phase shift.

Still another object of our invention is to provide new and improved means and method for compensating for undesired phase shift or for introducing desired phase shift wherein only one recording step is required.

Still another object of our invention is to provide new and improved means and method for compensating for phase errors introduced into an electrical circuit by means for which there is no physical counterpart known and having the reverse or negative phase error characteristic.

In accordance with our invention, there is provided a system in which a signal to be reproduced is recorded and then the recording medium containing the recorded message or signal is moved in the reverse direction to the direction prevailing during the recording step. The output of the reverse recording is then utilized in suitable reproducing apparatus such as a cathode ray oscilloscope, for example. The reverse channel or process includes a phase-shift-introducing device or means providing phase shift changes substantially equal and opposite to any shift introduced during the recording step, thereby compensating for such undesired distortion or phase shift.

If for any reason it is desired to introduce phase shift of predetermined characteristics into the output of electrical apparatus, as distinct from compensation, the reverse channel may be provided with means for introducing such desired shift.

When the desired shift in phase is unobtainable with known means, such as a network, for example, but the reverse characteristics can be provided with known components, our invention contemplates the insertion of the reverse characteristic during a recording or reproducing step. When the recording medium is then moved or run in the opposite direction, the desired characteristic appears in the output.

Figure 3:
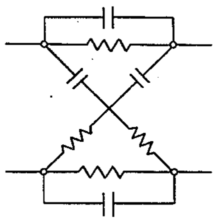
Figure 4:
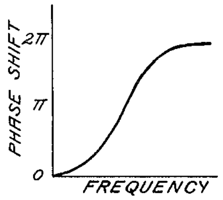
Figure 5:
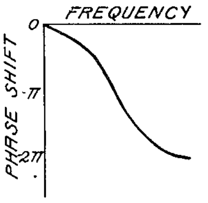

Further objects and advantages will become apparent as the following description proceeds. For a better understanding of our invention, reference is made to the following description and to the accompanying drawings in which Fig. 1 illustrates in block diagram form a system for compensating for distortion introduced into a recording process, Fig. 2 illustrates in block diagram fashion a system for purposely introducing phase shift characteristics into a recording system, Fig. 3 illustrates an all-pass network which is useful in certain applications of our invention, and Figs. 4 and 5 are charts illustrating the effects of the operation of a network such as that shown in Fig. 3, and Fig. 6 illustrates another embodiment of our invention.

Referring to Fig. 1, there is shown a recording and reproducing system arranged to compensate for errors arising in a microphone coupling circuit. In Fig. 1*a*, numeral 1 indicates a condenser type microphone, and the numeral 2 represents the input coupling circuit for microphone 1. The output of the coupling circuit 2 may be suitably amplified in a suitable amplifier stage 3 and then recorded by means of suitable recording apparatus 4. The type of recorder forms no part of our present invention and the recording medium may comprise a conventional disc record, such as a shellac record, for example, or the recording process may be of the magnetic recorder type, for example. Thus, there may be provided a recorder 4 having a recording head 16 of the magnetic type. Means, such as a motor 17 may be provided for moving a magnetic medium 18 from storage reel 19 to take up reel 20.

As explained hereinbefore, the microphone 1, for example, may introduce serious phase distortion in the signals or electrical quantity to be recorded. If, for example, a study of wave shape or pulse form is being carried out, the distortion in the output may be sufficient to render useless or seriously impair such investigation.

Fig. 1*b* illustrates in block form a system for compensating for such phase distortion. There is shown means for reproducing the signal recorded on the recording medium, as indicated by numeral 5. Medium 18 may be moved from spool 20 to spool 21 past a reproducing head 22, as by means of motor 23, for example. The reversal may take place on the same apparatus or on different recording-reproducing apparatus. After amplification by a suitable amplifier 6, the reproduced signal or electrical quantity may be introduced into a utilization device 7 such as a cathode ray oscilloscope. In order to compensate for phase distortion introduced during the recording process and, indeed, during the first portion of the reproducing process, a network 8 may be introduced in the reverse channel. In the example being considered, wherein the phase distortion is due to the condenser microphone 1, network 8 may comprise an R-C network having a time constant equal to the time constant of the microphone, in which case the phase error of the microphone is completely canceled.

In Fig. 2 there is represented apparatus required to produce the negative or reverse phase characteristic of any practical network. For example, all-pass networks have been used for phase shift compensation because such circuits or networks provide phase shift characteristics and have substantially constant attenuation as a function of frequency. An example of such an all-pass network is shown in Fig. 3. Such networks have a positive slope as represented in Fig. 4. Referring to Fig. 5, there is represented a phase characteristic for which, so far as is known, there is no physical counterpart. It is noted, however, that the characteristic illustrated in Fig. 5 is the reverse of, i. e., is equal and opposite to, that shown in Fig. 4 which does represent a known network. Our invention contemplates utilizing the network which is capable of producing the characteristic shown in Fig. 4 for producing the characteristic shown in Fig. 5. The necessary apparatus is illustrated in Fig. 2 wherein there is represented in Fig. 2*a* a source 9 of signal or an electrical quantity, an amplifier 10, and recording apparatus 11 which may be the same as, or similar to, that shown in Fig. 1. In order to produce a recording or a presentation having the reverse phase characteristic of a known network, there is provided in Fig. 2*b*, means 12 for reproducing the recording provided by recording means 11 in the reverse direction, an amplifier 13, and a network 14 having a phase characteristic opposite that of the desired characteristic. If the output of network 14 is displayed, as by oscilloscope 15, the sense of the display will be the reverse of the signals from source 9 but, except for the reversed presentation, the effect of network 14 appears to be the same as if a network had been inserted in the recording channel having a phase characteristic the reverse of that provided by network 14, and the reproducing channel omitted.

Figure 6A:
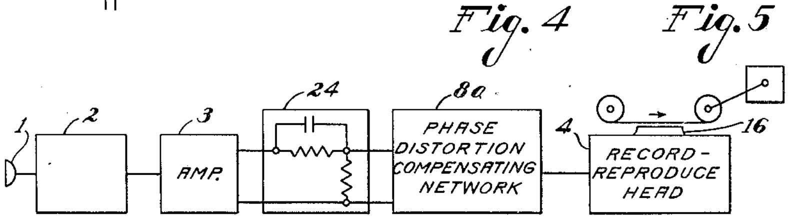
Figure 6B:
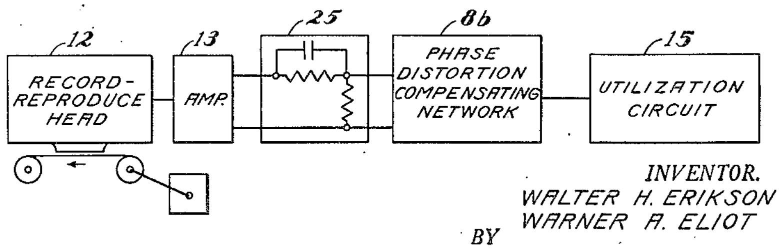

While there has been described above a system for compensating for undesired phase shift, our invention is not limited to providing compensation only in the reproducing channel. It is also contemplated that partial compensation may be employed in the recording channel and further compensation provided in the reproducing channel. For example, referring to Fig. 6, there is shown in Fig. 6*a* a recording channel employing the same elements as illustrated in Fig. 1*a*. In addition, there is provided a suitable phase distortion compensating network 8*a* designed to partially compensate for phase distortion introduced in the recording channel preceding the network. Fig. 6*b* represents a reproducing channel generally similar to the components shown in Fig. 1*b* except that a phase distortion compensating network 8*b* is provided, of such a nature as to further compensate for distortion remaining uncompensated after passage through network 8*a* in the recording channel and distortion arising thereafter.

If the use of compensating networks results in unsatisfactory over-all frequency response characteristics, or if some other consideration so dictates, any desired amount of frequency response equalization can be used without introducing any phase distortion. This may be accomplished by using equalizing networks 24 and 25 which provide, for example, one-half of the required equalization at each frequency in each of the recording and reproducing channels. Since the equalizing network is used in the recording and the reversed reproduction channels, any phase distortion arising therefrom is canceled and the required frequency response correction is obtained.

While there has been described what is at present considered the preferred embodiment of the invention, it will be obvious to those skilled in the art that various changes and modifications may be made therein without departing from the invention. For example, all compensation may be accomplished in the recording channel. It is, therefore, aimed in the appended claims to cover all such changes and modifications as fall within the true spirit and scope of the invention.

What is claimed is:

1. Apparatus for developing a phase shift characteristic which is the reverse or negative of a known phase shift characteristic comprising a recording medium, means for moving said medium in a given direction, means for recording an electrical signal on said medium, means for moving said medium in a direction which is the reverse of said given direction, means for reproducing during the reverse movement the signal recorded on said medium, utilization means, and means for supplying the reproduced reversed signal to said utilization means, said supplying means including a network having the known phase characteristic.

2. Apparatus for compensating undesired phase shift characteristics comprising a recording medium, means for moving said medium in a given direction, means for recording an electrical signal which is subject to undesired phase shift characteristics on said recording medium, means for moving said medium in a direction which is the reverse of said given direction, means for reproducing said signal during said reversed movement, phase shift means having phase shift characteristics substantially the reverse of the undesired characteristic, means for passing said reproduced reversed signal through said phase shift means whereby the undesired phase shift characteristic is substantially compensated, and utilization means for utilizing the compensated reproduced signal.

3. Apparatus for compensating undesired phase shift characteristics comprising a recording medium; means for moving said medium in a given direction; a recording channel including means for recording an electrical signal which is subject to undesired phase shift characteristics on said recording medium and means for partially compensating said undesired characteristics; a reproducing channel including means for moving said medium in a direction which is the reverse of said given direction, means for reproducing said signal during said reversed movement, phase shift means having phase shift characteristics substantially the reverse of the uncompensated portion of the undesired characteristic, and means for passing said reproduced reversed signal through said phase shift means whereby the uncompensated portion of the undesired phase shift characteristic is substantially compensated; and utilization means for utilizing the reproduced signal.

4. In a sound system having a source of electrical signals to be recorded and a recording channel including a transducer which has undesirable phase shift characteristics, means in said recording channel for partially compensating said undesired phase shift, and a reproducing channel including an electrical component having a phase shift characteristic which is substantially the reverse of the uncompensated portion of the undesired phase shift characteristic, whereby there results substantial phase shift compensation in signals recorded in said recording channel and reproduced in said reproducing channel.

5. In a sound system having a source of electrical signals to be recorded and a recording channel including an electrical component which has undesired phase shift characteristics, and a reproducing channel; the steps of recording said signals on a recording medium, reversing the direction of movement of said medium, reproducing said signals during said reverse movement through a reproducing channel having a phase shift characteristic substantially the reverse of the undesired phase characteristics, and electrically shifting the phase of the reproduced signals in order to compensate for the undesirable characteristic.

6. In a sound system for developing a phase shift characteristic which is the reverse or negative of a known phase shift characteristic comprising a recording medium, means for moving said medium in a given direction, means for recording an electrical signal on said medium, and means for moving said medium in a direction which is the reverse of said given direction; the steps of recording an electrical signal on the recording medium, reversing the direction of movement of said medium, reproducing said signal during said reverse movement, and electrically shifting the phase of the reproduced signals according to said known phase shift characteristic.

WARNER A. ELIOT.
WALTER H. ERIKSON.

References Cited in the file of this patent

UNITED STATES PATENTS

| Number | Name | Date |
|---|---|---|
| 1,870,778 | Lang | Aug. 9, 1932 |
| 2,008,699 | Hammond | July 23, 1935 |
| 2,218,399 | LeBel | Oct. 15, 1940 |
| 2,446,479 | Begun | Aug. 3, 1948 |